US006959797B2

(12) United States Patent
Mintgen et al.

(10) Patent No.: US 6,959,797 B2
(45) Date of Patent: Nov. 1, 2005

(54) PISTON-CYLINDER ASSEMBLY WITH BRAKING DEVICE

(75) Inventors: Rolf Mintgen, Thür (DE); Castor Fuhrmann, Brachtendorf (DE)

(73) Assignee: Stabilus GmbH, Koblenz (DE)

( * ) Notice: Subject to any disclaimer, the term of this patent is extended or adjusted under 35 U.S.C. 154(b) by 298 days.

(21) Appl. No.: 09/961,821

(22) Filed: Sep. 24, 2001

(65) Prior Publication Data

US 2002/0038599 A1 Apr. 4, 2002

(30) Foreign Application Priority Data

Sep. 26, 2000 (DE) .......................... 100 47 433

(51) Int. Cl.[7] .............................................. F16F 9/34
(52) U.S. Cl. .............................. 188/322.15; 188/282.5; 188/319.1
(58) Field of Search .................... 267/64.11, 64.12, 267/64.15, 129; 188/281, 282.1, 282.5, 283, 284, 319.1, 322.13, 322.15; 277/636

(56) References Cited

U.S. PATENT DOCUMENTS

| | | | |
|---|---|---|---|
| 3,727,281 A | * | 4/1973 | Erickson et al. .............. 29/241 |
| 3,806,105 A | * | 4/1974 | Konishi et al. ............. 188/129 |
| 4,066,279 A | * | 1/1978 | Kaptanis ..................... 188/288 |
| 4,336,746 A | * | 6/1982 | Morith ...................... 92/130 B |
| 4,595,182 A | * | 6/1986 | Freitag et al. .............. 267/120 |
| 4,635,908 A | * | 1/1987 | Ludwig .................... 267/64.11 |
| 4,653,617 A | * | 3/1987 | Casimir et al. ............. 137/906 |
| 4,838,393 A | * | 6/1989 | Mourray et al. ............ 188/284 |
| 4,909,488 A | * | 3/1990 | Seibert et al. .............. 267/120 |
| 5,001,965 A | * | 3/1991 | Ruddy et al. ................ 277/453 |
| 5,303,906 A | * | 4/1994 | Cotter et al. ................ 188/300 |
| 5,441,133 A | * | 8/1995 | Murakami ............... 188/282.5 |
| 5,529,154 A | * | 6/1996 | Tanaka ....................... 188/280 |
| 5,823,512 A | * | 10/1998 | Oyaizu .................. 188/322.17 |
| 5,915,674 A | * | 6/1999 | Wolf et al. .................. 188/300 |
| 6,007,057 A | * | 12/1999 | Fuhrmann et al. ....... 267/64.15 |
| 6,047,797 A | * | 4/2000 | Popjoy ....................... 188/269 |
| 6,086,005 A | * | 7/2000 | Kobayashi et al. ......... 188/182 |
| 6,179,100 B1 | * | 1/2001 | Mintgen et al. ......... 188/282.1 |
| 6,202,979 B1 | * | 3/2001 | Wolfgang et al. ............. 251/50 |

FOREIGN PATENT DOCUMENTS

| | | |
|---|---|---|
| DE | 27 21 933 | 11/1978 |
| DE | 39 23 512 | 1/1991 |
| DE | 19820404 A1 * | 2/1999 |
| DE | 198 46 373 | 4/2000 |

OTHER PUBLICATIONS

English Abstract of DE–19846373.*

* cited by examiner

*Primary Examiner*—Robert A. Siconolfi
(74) *Attorney, Agent, or Firm*—Cohen, Pontani, Lieberman & Pavane

(57) ABSTRACT

In a piston-cylinder assembly comprising a cylinder in which a piston rod is installed with freedom of axial movement and which is filled with a blocking medium, a braking device becomes active when the piston-cylinder assembly moves faster than a defined speed and thus limits the speed to a desired extent. A valve body divides the cylinder into two working spaces, which are connected to each other by at least one flow-through opening. As soon as the defined speed is exceeded, the dynamic pressure in the working space elastically deforms a disk, which has the effect of at least partially sealing off the flow-through opening(s) in opposition to the forces trying to keep them open. The elastic deformation of the disk represents a closing movement relative to the cross section of the flow-through opening(s). The disk takes the form of a valve ring, which is installed in a valve ring groove with a certain freedom of axial movement. The valve ring moves toward one or the other side wall of the groove depending on the direction of movement and thus at least partially seals off the minimum of one flow-through opening as a result of the dynamic pressure-induced deformation of the valve ring.

9 Claims, 3 Drawing Sheets

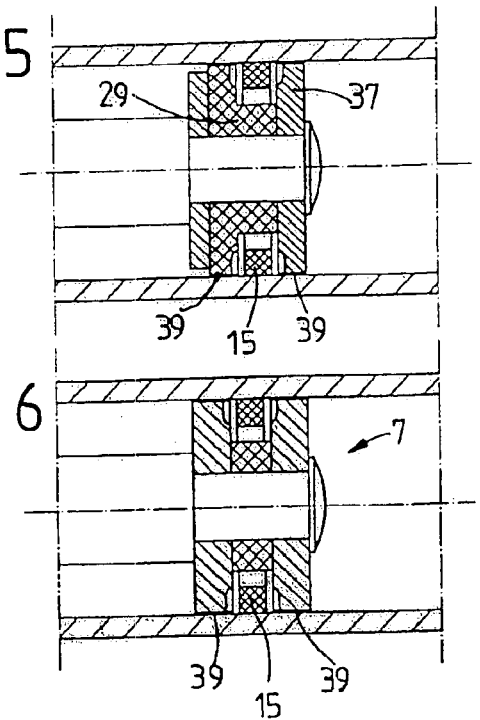
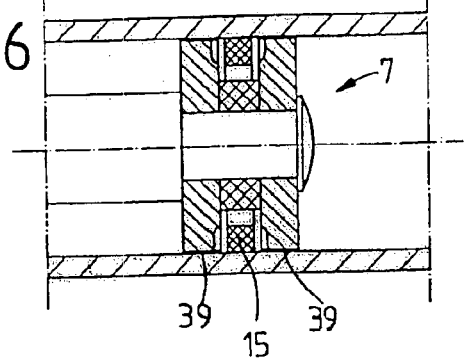
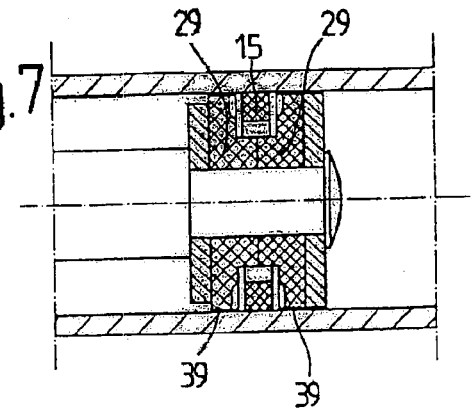
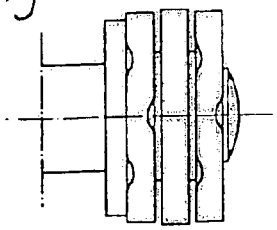
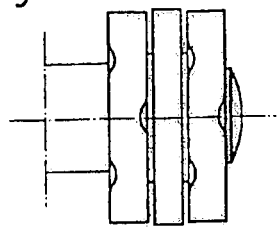
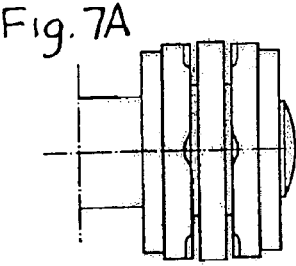
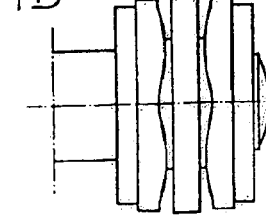
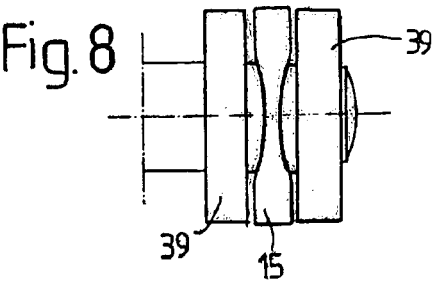

PISTON-CYLINDER ASSEMBLY WITH BRAKING DEVICE

BACKGROUND OF THE INVENTION

1. Field of the Invention

The invention pertains to a piston-cylinder assembly with a braking device according to the introductory clause of claim 1.

2. Description of the Related Art

U.S. Pat. No. 6,007,057 discloses a piston-cylinder assembly comprising a cylinder, in which a piston rod is installed with freedom of axial movement. The cylinder is filled with gas, which exerts an ejection force on the piston rod. This force is associated with a certain maximum excursion speed of the piston rod. In cases where external forces cause the speed of this movement to exceed the maximum excursion speed, a braking device becomes active, which limits the speed to a desired value. A piston, which divides the cylinder into two working spaces, is attached to the piston rod; the two spaces are connected by at least one flow-through opening. When the rod moves at a speed greater than that defined for it, the dynamic pressure in the working space causes a cover disk to close off the flow-through opening(s) at least partially in opposition to the forces which are trying to keep them open. The dynamic pressure in the working space assigned to the cover disk leads to an elastic deformation of the cover disk. This deformation represents a closing movement relative to the cross section(s) of the flow-through opening(s).

Valve designs can be imagined in which the top surface of the piston is not available for a cover disk. In this case, it is possible, under certain conditions, to provide a piston valve according to DE 3,923,512. This, however, leads to the new problem that there are only a few, limited possibilities for providing a properly designed flow connection between the working spaces. In addition, the design of the valve itself is already rather complicated.

SUMMARY OF THE INVENTION

The object of the present invention is to realize a piston-cylinder assembly with a braking device, so that the greatest possible design freedom is obtained in regard to the design of the valve.

According to the invention, the disk takes the form of valve ring which is able to move axially inside a valve ring groove; the valve ring moves toward one or the other side wall of the groove depending on the direction of motion and the minimum of one flow-through opening is at least partially sealed off as a result of the dynamic pressure-induced deformation of the valve ring.

The advantage of the invention is that a very simple and sturdy part such as a valve ring can be installed at any desired point along the flow-through opening. The top surface or bottom surface of the piston upon which additional springs may act, for example, are not obstructed by valve parts. In addition, the valve ring can be installed very easily, and several flow-through openings can be controlled with a single valve ring.

In a design variant, the valve ring has a corrugated profile on the side facing the flow opening to be sealed. The valley area of the valve ring is deformed by the dynamic pressure and thus pushed into the flow-through opening. Otherwise, the valve ring conforms in this area to the contour of the flow-through opening.

As an alternative, the flow-through openings to be sealed have a stepped cross-sectional profile in the area of the side wall of the groove.

To prevent the valve ring from sticking to the side wall of the groove, the valve ring is frictionally locked to the inside wall of the cylinder.

It is also quite possible for the flow-through openings in both side walls of the groove to be opened and closed by the valve ring as a function of the dynamic pressure. As a result, the speed of the piston-cylinder assembly can be limited in both directions by a single valve ring.

It is advantageous for the valve body to be formed by the piston of the piston-cylinder assembly and for an additional pressure-dependent valve to be used. Through the use of two dynamic pressure-dependent valves, the braking action on the motion of the rod can be very strong, and if one of the dynamic pressure-dependent valves fails, a redundant component is present.

The piston can have a dynamic pressure-dependent valve for one direction of motion of the piston rod and another dynamic pressure-dependent valve for the other direction of piston rod movement. Thus, different braking effects can be realized for each of the movements of the piston-cylinder assembly.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 5 is a cross-section of a second embodiment of the piston;

FIG. 5A is a side view of the piston of FIG. 5 with the pass-through openings in the open position;

FIG. 6 is a cross-section of a third embodiment of the piston;

FIG. 6A is a side view of the piston of FIG. 6 with the pass-through openings in the open position;

FIG. 7 is a cross-section of a fourth embodiment of the piston;

FIG. 7A is a side view of the piston of FIG. 7 with the pass-through openings in the open position;

FIG. 7B is a side view similar to FIG. 7A, but with shallower pockets; and

FIG. 8 is a side view of a piston with pockets in the valve ring.

DETAILED DESCRIPTION OF THE PRESENTLY PREFERRED EMBODIMENTS

Figure 1:
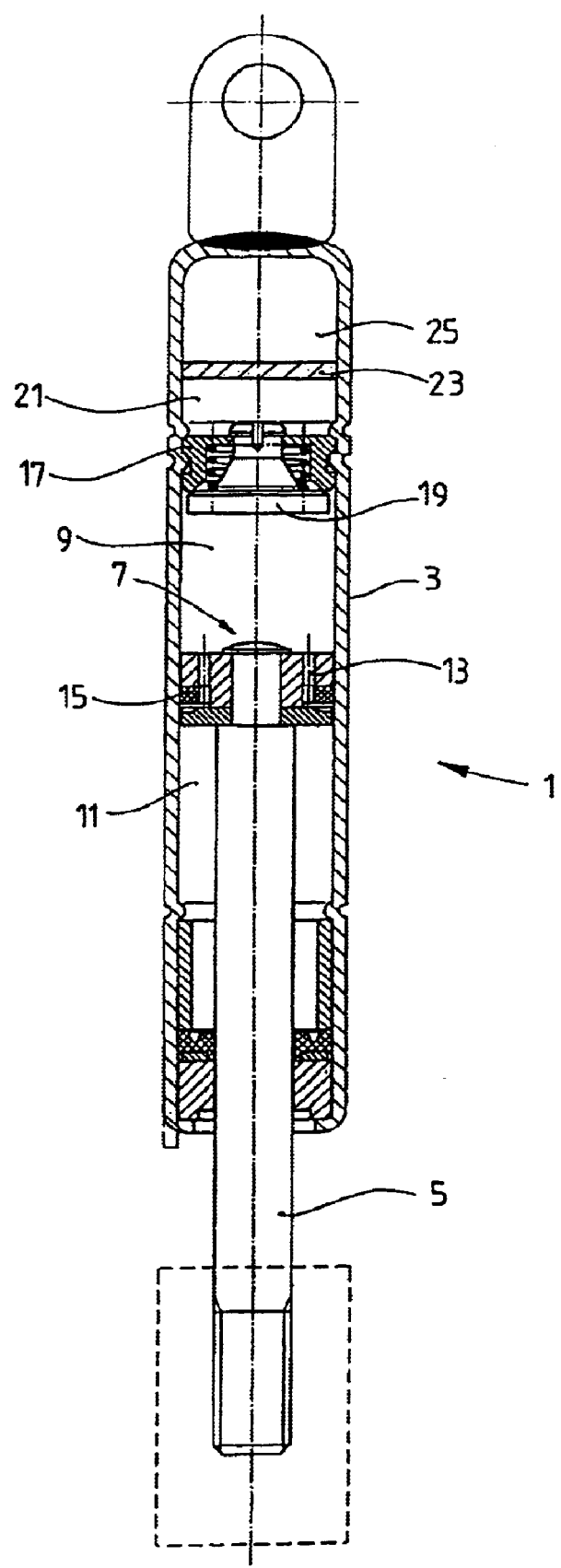
FIG. 1 is a cross section of a piston-cylinder assembly.

FIG. 1 shows a piston-cylinder assembly 1, which has a cylinder 3, in which a piston rod 5 is installed with freedom of axial movement. A piston 7, which divides the cylinder 3 into two working spaces 9, 11 filled with a blocking medium such as oil, is attached to the piston rod 5. The piston has a number of flow-through openings 13, which connect the two working spaces 9, 11 to each other as a function of the switching position of a disk-shaped valve ring 15. The piston-cylinder assembly can also have an intermediate wall 17, in which a dynamic pressure-dependent valve 19 is installed, which establishes a flow connection between the working space 9 and an additional space 21, also filled with blocking medium. Depending on where it is located, the space 21 can be separated by a separating piston 23 from an equalization space 25, filled with gas such as air of nitrogen. This gas is at a pressure above atmospheric pressure, the exact value depending on the purpose which the piston-cylinder assembly is intended to serve.

Figure 2:
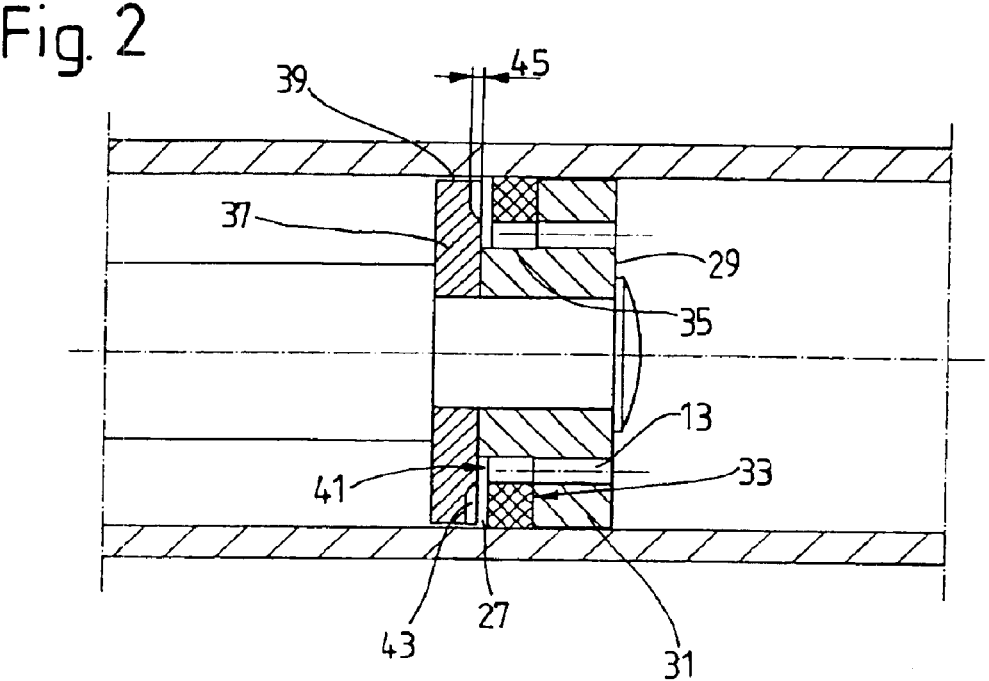
FIG. 2 is an enlarged cross-section of the piston of FIG. 1.

FIG. 2 shows only a magnified area of the piston 7 with its piston rod 5. The piston has a valve ring groove 27, which is connected to the flow-through openings 13. The valve ring groove is slightly wider than the valve ring, so that the valve ring 15 is free to move axially inside the valve ring groove 27. A friction-locking connection is present between the valve ring and the inside wall of the cylinder 3. The valve ring 15 is preferably made of a plastic which can be subjected to elastic deformation.

The piston 7 consists of a graduated piston base body 29, through which the pass-through opening s 13 extend. A flange 31 of the piston base body forms a first side wall 33 of the groove and the base 35 of the valve ring groove 27. The outer circumference of a cover disk 37, which rests axially on the piston base body 29, cooperates with the inside wall of the cylinder to form an extension 39 of the flow-through openings 13. The cover disk 37 forms the second side wall 41 of the groove 27 for the valve ring 15. On the inside of the cover disk, in the area of the extension 39, a stepped cross-sectional profile 43 is provided in the form of pockets. The pockets in the second side wall of the groove are corrugated.

Figure 3:
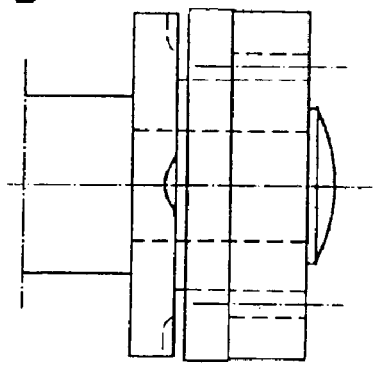
FIG. 3 shows the pass-through openings of the piston in the open position.
Figure 4:
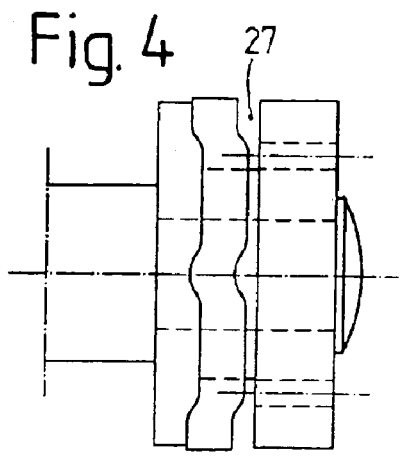
FIG. 4 shows the pass-through openings of the piston in the closed position.

When the piston rod 5 moves inward toward working space 9 the valve ring 15, which starts out in the switching position of FIGS. 2 and 3 in which the flow-through openings are completely open, moves axially toward the second side wall 41 of the groove, since it frictionally engages to the inside wall of the cylinder 3. If the speed of this movement is faster than intended, a dynamic pressure acts inside the valve ring groove 27 between the side wall 33 and the valve ring 15 and thus deforms the valve ring 15 as shown in FIG. 4, causing it to execute a closing movement 45 (see FIG. 2) into the pockets 43 of the cover disk 37. When this occurs, the flow path between the extension 39 and the flow-through openings in the piston base body is blocked, and the extent to which the piston rod can move inward is reduced, possibly even to zero, as a result of the sealing function of the valve ring.

FIGS. 5–7 show that the valve ring 15 can also be used to operate in both directions of the movement of the rod. In this case, both side walls 33; 41 of the groove are designed with appropriately stepped cross-sectional profiles. In addition, the flow-through openings do not necessarily have to take the form of bores 13 as shown in FIG. 2; that is, they can also be designed as gaps extending circumferentially on both sides of the valve ring 15. All the variants according to FIGS. 5–7 are optimized with respect to the reliability with which they can be assembled. For example, the cover disk 37 in FIG. 6 can be installed on either side, because the cross-sectional profiles 43 are provided on both sides. In addition, the pistons according to FIGS. 6 and 7 are completely symmetrical, the piston of FIG. 7 consisting of two piston base bodies 29 similar to those shown in FIG. 2.

As an alternative to the cross-sectional profiles in the side walls 33; 41 of the groove, the valve ring 15 itself could have a corrugated profile, as illustrated in FIG. 8.

In FIG. 1, in addition to the dynamic pressure-switched valve in the piston, another dynamic pressure-switched valve 19 is also provided, the action of which is superimposed on that of the piston valve, so that, overall, a powerful blocking effect can be obtained. The valve 19 consists of a valve body with a conical valve surface, which can be moved against the force of a spring onto a valve seating surface on the intermediate wall. It is also possible for the piston valve to be designed to operate in one direction of piston rod movement and for the valve in the intermediate wall 17 to be designed to operate in the other direction.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A piston-cylinder assembly comprising
a cylinder containing a blocking medium,
a piston rod which is axially movable in said cylinder, and
a piston affixed to said piston rod and dividing said cylinder into two working spaces, said piston comprising at least one flow-through opening connecting said working spaces, a ring groove bounded by axially opposed side walls, and an elastically deformable valve ring seated in said ring groove with axial play, said valve ring frictionally engaging said cylinder, said at least one flow-through opening comprising at least one pocket formed in at least one of said side walls, said at least one pocket being completely open when said piston rod is at rest with respect to said cylinder, said valve ring moving toward one of said side walls as a function of the direction of movement of said piston rod, said valve ring deforming into said at least one pocket to at least partially seal off said at least one pocket when the piston rod exceeds a predetermined speed relative to the cylinder, so that flow of said blocking medium between said working spaces is impeded and said speed is limited.

2. A piston-cylinder assembly as in claim 1 wherein said at least one flow-through opening in one of said side walls is at least partially sealed off as a function of dynamic pressure in one of said working chambers, said dynamic pressure being a function of the speed of the piston rod.

3. A piston-cylinder assembly as in claim 1 further comprising a valve body in one of said working spaces.

4. A piston-cylinder assembly as in claim 3 wherein said piston is a dynamic pressure dependent valve which operates in one direction of movement of the piston rod, said valve body in said one of said working spaces being a pressure dependent valve which operates in the other direction of movement of the piston rod.

5. A piston-cylinder assembly comprising a cylinder containing a blocking medium, a piston rod which is axially movable in said cylinder, and a piston fixed to said piston rod and dividing said cylinder into two working spaces, said piston comprising at least one flow-through opening connecting said working spaces, a ring groove bounded by axially opposed side walls, and an elastically deformable valve ring seated in said ring groove with axial play, said valve ring having a corrugated profile when said piston rod is at rest with respect to said cylinder, said corrugated profile facing said at least one flow-through opening, said valve ring moving toward one of said side walls as a function of the direction of movement of said piston rod, said corrugated profile deforming toward said at least one flow through opening to at least partially seal off said at least one flow-through opening when the piston rod exceeds a predetermined speed relative to the cylinder, whereby flow of said blocking medium is impeded and said speed is limited.

6. A piston-cylinder assembly as in claim 5 wherein said valve ring frictionally engages the cylinder.

7. A piston-cylinder assembly as in claim 5 wherein said at least one flow-through opening in one of said side walls is at least partially sealed off as a function of dynamic pressure in one of said working chambers, said dynamic pressure being a function of the speed of the piston rod.

8. A piston-cylinder assembly as in claim 5 further comprising a valve body in one of said working spaces.

9. A piston-cylinder assembly as in claim 8 wherein said piston is a dynamic pressure dependent valve which operates in one direction of movement of the piston rod, said valve body in said one of said working spaces being a pressure dependent valve which operates in the other direction of movement of the piston rod.

\* \* \* \* \*